Aug. 24, 1965  L. F. KOCHER  3,202,821
FILM BADGE SYSTEM AND METHOD OF USING
Filed March 11, 1963  3 Sheets-Sheet 1
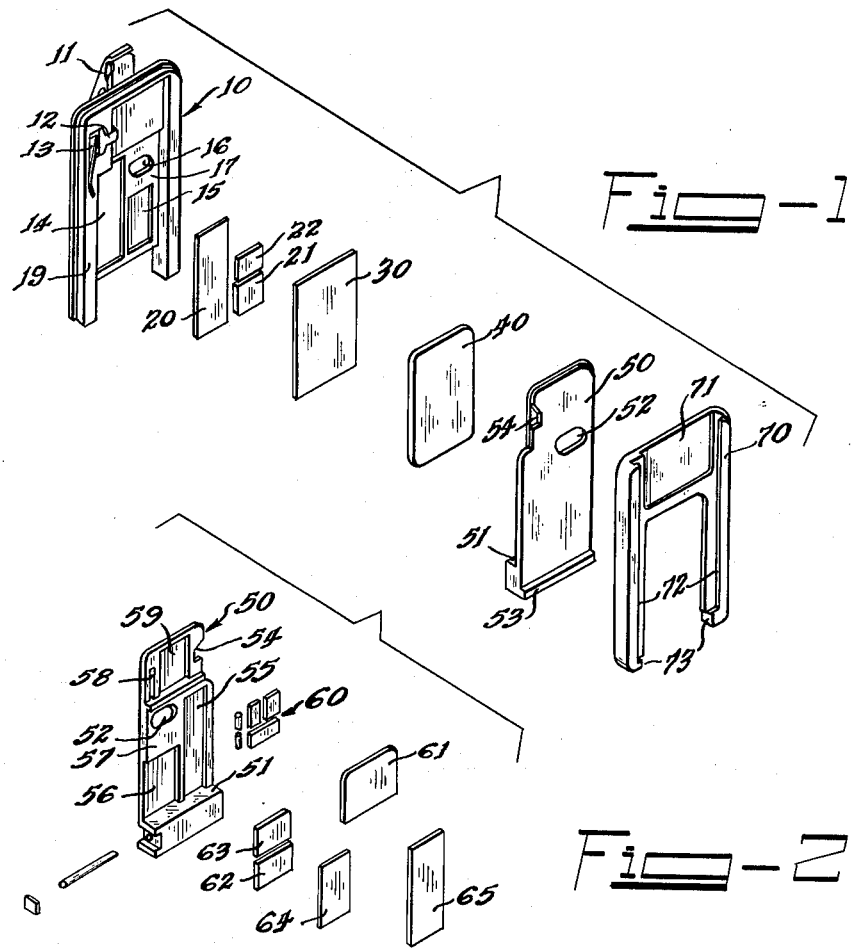
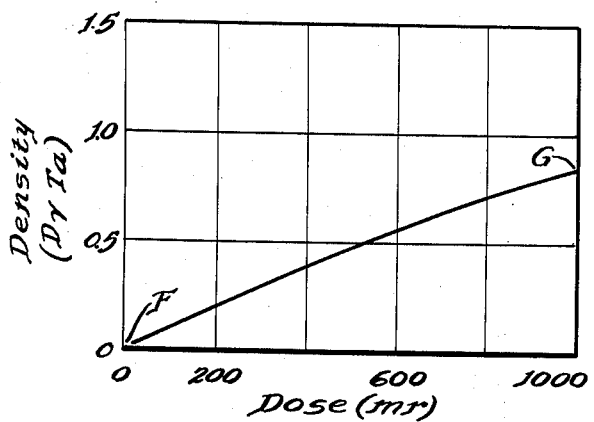
INVENTOR.
Leo F. Kocher
BY
Attorney

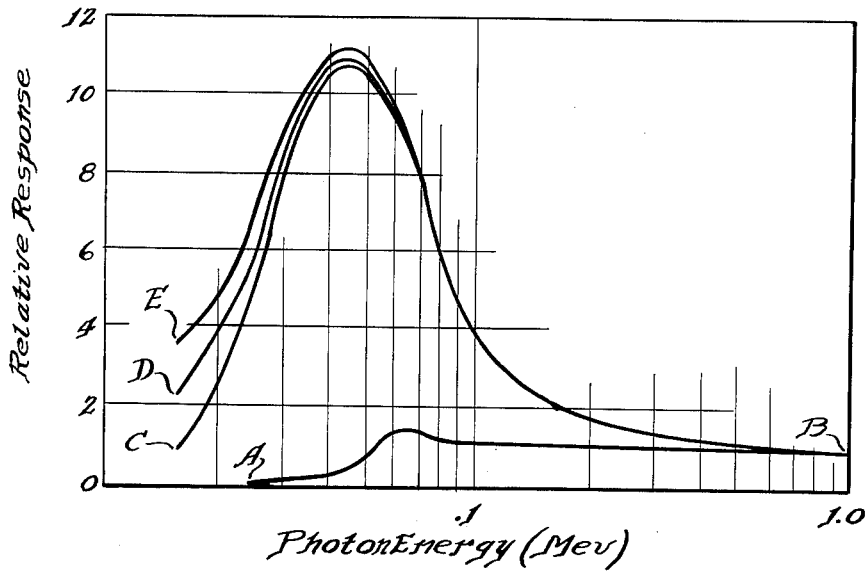
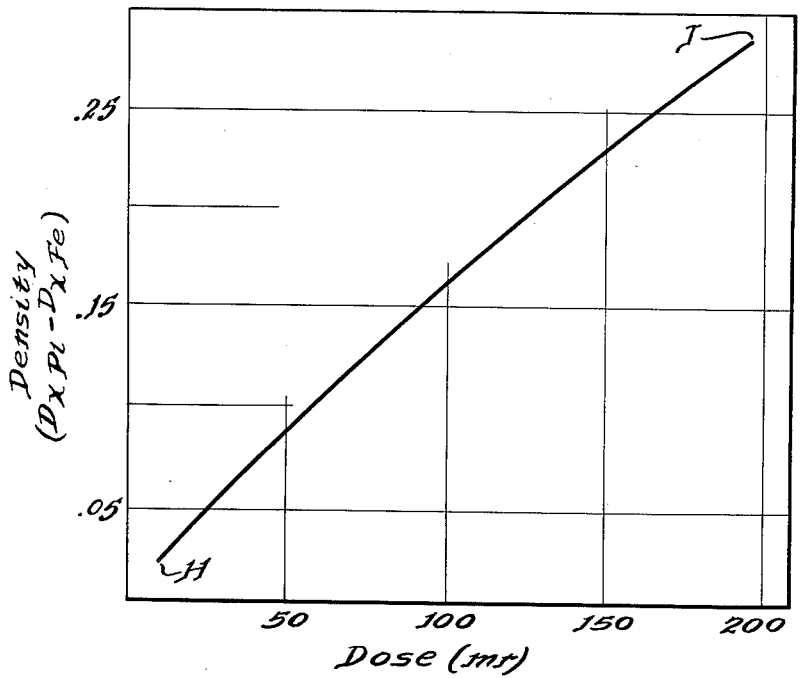

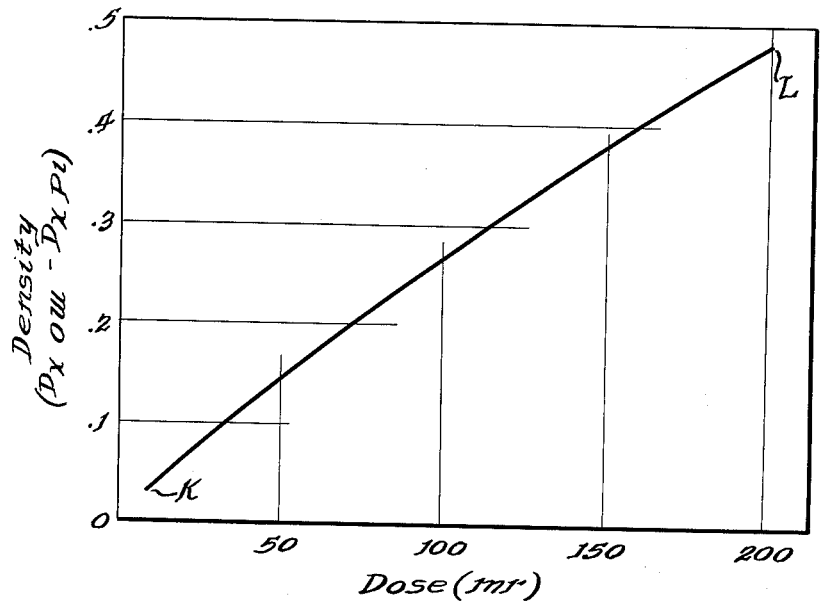
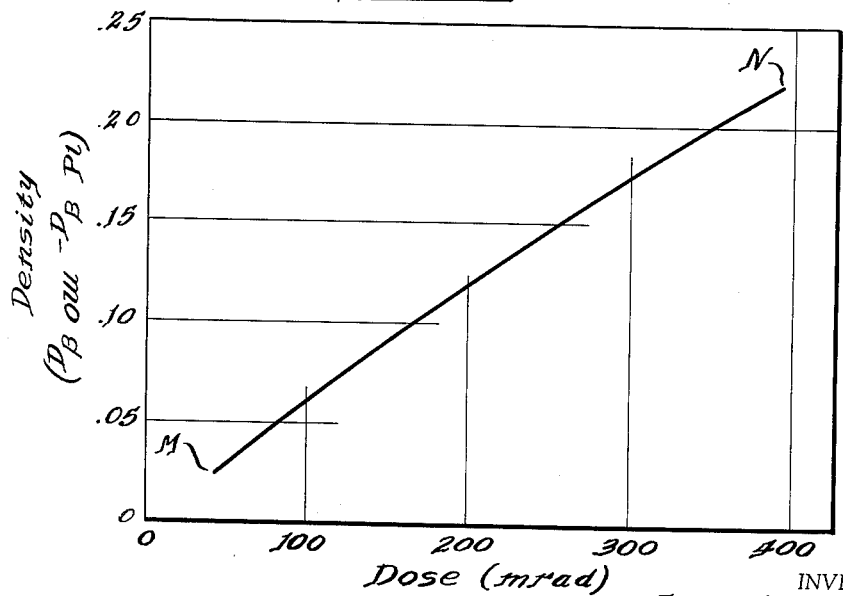

3,202,821
FILM BADGE SYSTEM AND METHOD OF USING

Leo F. Kocher, Richland, Wash., assignor to the United States of America as represented by the United States Atomic Energy Commission
Filed Mar. 11, 1963, Ser. No. 264,744
5 Claims. (Cl. 250—83)

The invention relates to a novel dosimeter system for insertion into film badges worn by personnel in locations where radiation monitoring is practiced, and a method of using the same, more particularly to a system and method of quantitatively determining therefrom X-ray dosages, high and low energy gamma dosages and beta dosages from mixed radiation.

Film badges for the monitoring of radiation dosages received by personnel at nuclear reactor sites and other such installations are well known. In general, they consist of arrays, or systems, of radiation-absorbing elements, or filters, placed over a photographic plate, or film, within a plastic enclosure; the latter is affixed to the clothing by a clip or other such holding device. After a certain length of time, usually a few days, the badge is turned in and the photographic plate is developed, and from the relative darkening of different areas of the plate the radiation received can be determined within limits. Examples of film badges can be seen in U.S. Patents Nos. 2,483,991; 2,659,013; 2,855,519; 2,938,121 and elsewhere.

The chief shortcomings of film badge systems now in use are that they do not discriminate in all cases between different kinds of radiations, and that the evaluations of dosages that may be derived from them are not altogether quantitative, or only within rather broad limits. Since, however, the different kinds of radiation have entirely diverse biological effects, it is desirable that the evaluations of radiations be discriminatory in a qualitative way; this is especially true in case of a serious accident involving radioactivity. Furthermore, since the biological effects have been found to be cumulative over the lifetime of a given individual, the need for accurate quantitative evaluations of radiation is apparent.

It is, accordingly, the general object of the invention to provide a qualitatively and quantitatively accurate film badge system for evaluating X-rays, gamma rays and beta rays.

It is a more particular object to provide such a system and a method of deriving therefrom accurate quantitative determinations of X-rays, gamma rays and beta rays.

It is a further object to provide a film badge incorporating the system just mentioned.

Other objects will appear as the description proceeds.

According to the invention, different areas of the photographic plate of a film badge are covered with filters of tantalum, iron and plastic, and a fourth area is allowed to be substantially unshielded from radiation other than, of course, that of light. This fourth area will hereafter be referred to as the open window, or by the initials OW, although, in addition to shielding from light, it may also have a covering of paper, thin plastic or the like, for the purpose of keeping out dust or identifying the wearer of the film badge. After the badge has been worn for a given period it is collected, the photographic plate or film developed, and the optical densities of the four areas are read with the aid of a device such as a densitometer; from the optical density readings thus made I have discovered a method of calculating the respective amounts of radiation received due to gamma rays, due to X-rays or low energy gamma rays, and due to beta rays.

Reference is now made to the drawings, FIG. 1 of which is an exploded perspective view of a film badge according to the invention.

FIG. 2 is an exploded perspective view of a slide, or insert for the film badge of FIG. 1.

FIG. 3 is a graph in which dosages of photon energy in mev., as abscissae, are plotted against relative responses in optical density units of areas of 508 photographic film behind the filters in my dosimeter system, as indicated by the legend on the graph. The thicknesses of the filters will be set forth below.

FIG. 4 is a graph in which doses of gamma radiation from radium in milliroentgens (mr.) as abscissae are plotted against standard optical density units resulting on the same type of photographic plate from such radiation through a filter of substantially pure tantalum metal 20 mils thick, as ordinates ($D_{\gamma Ta}$). Standard optical density units are defined as $$\log_{10}\left(\frac{I_i}{I_t}\right)$$

where $I_i$ is the intensity of incident light, and $I_t$ is the intensity of transmitted light.

FIG. 5 is a graph in which doses of 16 kev. fluoroescent X-rays in milliroentgens are plotted as abscissae against the differences in standard optical density units between the area of the same photographic plate covered by a filter of 70 mils of plastic and the area covered by a filter of 1 mil of iron, as ordinates ($D_{XPl}-D_{XFe}$). The particular plastic used was Cycolac, an acrylonitrile-butadiene-styrene copolymer, and the iron was substantially pure iron.

FIG. 6 is a graph in which doses of 16 kev. fluoroescent X-rays in miliroentgens are plotted as abscissae against the differences in standard optical density units between the area of the same photographic plate covered by the "open window" and the area covered with the same plastic mentioned above ($D_{XOW}-D_{XPl}$).

FIG. 7 is a graph in which doses of uranium beta rays in millirads as abscissae are plotted against the differences in optical density units between the area of the same photographic plate covered by the open window and the area covered by the same plastic filter ($D_{\beta OW}-D_{\beta Pl}$).

Referring to FIG. 1, the numeral 10 designates the back of the film badge. It is a single piece of molded plastic material, the plastic used in the preferred embodiment shown here being Cycolac, a copolymer of acrylonitrile, butadiene and styrene, or ABS plastic.

Attached to the back 10 is metal clip 11 for the purpose of affixing the film badge to the clothing of the wearer. 12 is the latch of the locking mechanism and 13 is a leaf-spring urging latch 12 into the locked position; details of the locking mechanism are to be found in U.S. Patent No. 2,855,519. An elongated recess 14 and a shorter recess 15 are molded into the plastic of back 10, and open window 16 is located at a distance above the latter. In the preferred embodiment here shown the open window (OW) is ⅜" by ½".

The space 17 intermediate the shorter recess 15 and the open window 16 will be referred to as the plastic area, or filter; in the preferred embodiment here shown the plastic area is ⅜" by ½" and 70 mils thick of ABS plastic. Finally, back 10 has a raised rim 19 that runs around three sides, but is absent across the bottom.

Immediately in front of back 10 in the exploded view is lead plate 20, which fits snugly into recess 14. This has no function so far as the invention is concerned, and is merely for the purpose of protecting the identifying portion of the photographic plate from stray radiation.

To the right of lead plate 20 is tantalum filter or shield 21 of substantially pure tantalum metal, and iron filter or shield 22, of substantially pure iron. Together filters 21 and 22 fit within the recess 15. In the preferred embodiment here shown tantalum filter 21 is ½" by ½" and 20 mils thick, and iron filter 22 is ⅜" by ½" and 1 mil thick.

Next in front of elements 20, 21 and 22 is plastic sheet 30 which, when assembled, it closely covers. Its dimensions are large enough to cover not only the filters mentioned but also the plastic area 17 and the open window 16; in the embodiment here shown it is 20 mils thick and made of Tenite II, a cellulose acetate-butyrate plastic. Beside excluding dust from the open window 16 sheet 30 filters out any soft X-rays generated in elements 20, 21 and 22 and thereby eliminates false readings from this source.

Next in front of plastic sheet 30 is the photographic plate 40, which is wrapped in paper of sufficient thickness to exclude light. It is of approximately the same dimensions as sheet 30.

Next in front of photographic plate 40 is insert, or slide, 50 which is of such dimensions as to slide snugly within the raised rim 19 of back 10. It has an inner raised rim 51 which, together with rim 19, forms a tight enclosure for the intermediate members of the film badge when assembled. Slide 50 has an open window 52 in register with open window 16, an outer raised rim 53, and a locking notch 54 for receiving latch 12 when assembled.

Referring now to FIG. 2, the insert, or slide 50 is shown in a reversed position from the way it is shown in FIG. 1. In this position it can be seen that it has an elongated recess 55 of the same dimensions as the recess 14 in back 10, and a shorter recess 56 of the same dimensions as recess 15. It is apparent that these would also both be in register with the recesses of the same size in the back if slide 50 were in the unreversed position of FIG. 1, as would also be true of plastic area 57 with respect to plastic area 17, and, as already noted, of open window 52 with open window 16. The thickness of the plastic areas, or filters 17 and 57 should be the same, and all other conditions should be adjusted so that the same, or at least a very similar intensity of radiation should impinge on the photographic plate 40 from either side. In the preferred embodiment here shown slide 50 and all other structural parts are also made of ABS plastic.

Slide 50 has two recesses 58 and 59 near the top which are for the accommodation of elements for high neutron and gamma radiation measurements; these are described in the publication HW–71710 available at the United States Atomic Energy Commission's Division of Technical Information Extension, Oak Ridge, Tennessee. Since they are not part of the invention, but only incidental, they will not be further described and are designated in the drawing collectively by the numeral 60. As a practical matter, however, it is normally convenient to combine such additional elements with the film badge system of the invention. Plastic sheet 61 holds element 60 in place within recesses 58 and 59 as shown.

To the left of sheet 61 is tantalum filter 62, identical with tantalum filter 21 and iron filter 63, identical with iron filter 22. These fit within recess 56 when assembled, and are held in place by plastic plate 64, of the same kind of material and thickness as sheet 30. Lead sheet 65 fits within recess 55, and is coded by round holes, slots or the like (not shown) to identify the wearer of the badge when the photographic plate 40 is developed.

The front 70 of the badge is also of ABS plastic and has a flat area (not shown) by which it can be joined, as by cementing, to the inner flat sides of the raised rim 19 of the back 10. It has a recess 71 for the reception of a label identifying the wearer of the badge if that is deemed advisable. It also has two slot forming lips 72 which, together with stops 73, form a snug holder for a security card. Since in many cases installations requiring radiation monitoring also require that personnel display visible security cards, this arrangement is convenient. The absence of any obstruction at the top enables personnel to withdraw their security cards when they turn in the badges for development, and to reinsert them in other badges with fresh photographic plates. If a security card is used as described, the thin sheet of plastic in the open window 16 should be of a thickness to counterbalance the slight radiation-attenuating effect of the paper or cardboard of the security card over open window 52.

The ability of my dosimeter, or film badge system to discriminate between several types of radiation when present together is in a large part due to the great diversity of responses of photographic film in terms of darkening, or densification, when exposed to photon energy behind the different filters or elements of my system. These can be seen from FIG. 3. The curve AB shows the response on photographic film No. 508 behind the tantalum filter; the curve CB the response behind the iron filter; the curve DB the response behind the plastic filter, and the curve EB the response behind the open window. It will be noted that the graph of this figure is semi-logarithmic and that, with the exception of the response of the film behind a tantalum filter, the responses behind all the other elements, the open window, the plastic filter, and the iron filter, show a considerable resemblance to one another, the curves CB, DB and EB rising to a maximum at about 0.05 mev. or 50 kev., and merging into a single curve shortly thereafter at greater energies, which merged curve falls and levels off to a constant value at about 0.9 mev. To the left of the maxima the curves diverge, the significance of which divergence will become more apparent as the description of my method proceeds.

In contrast to the responses just described, the response of the film behind the tantalum filter is mainly a constant value, equal to the constant value of the merged curve of the other responses after about 0.9 mev. The tantalum response curve AB shows a maximum, slightly greater than the constant value, at about 0.06 mev. and then falls off quite rapidly to the left until it vanishes at about 0.035 mev. or 35 kev. In other words, up until about 0.035 mev. the tantalum filter completely shuts out photon radiation, whether due to gamma rays or to X-rays.

It is further evident that when a film badge containing my system of filters, or elements, is exposed to a mixture of radiations, the darkening, or density, of each of the areas of the photographic plate in the badge, will be due to the sum of the effects from the different radiations permitted to pass through the filter, or element, covering the respective area. For a radiation field consisting of beta particles, gamma rays at energies greater than 50 kev., and either gamma rays or X-rays at energies less than 50 kev., the foregoing may be stated mathematically as follows:

$$D_{XTa} + D_{\gamma Ta} + D_{\beta Ta} = D_{Ta} \quad (A)$$
$$D_{XFe} + D_{\gamma Fe} + D_{\beta Fe} = D_{Fe} \quad (B)$$
$$D_{XPl} + D_{\gamma Pl} + D_{\beta Pl} = D_{Pl} \quad (C)$$
$$D_{XOW} + D_{\gamma OW} + D_{\beta OW} = D_{OW} \quad (D)$$

where $D_{XTa}$=Density behind the tantalum filter due to X-rays (<50 kev.)
$D_{\gamma Ta}$=Density behind the tantalum filter due to gamma rays (>50 kev.)
$D_{\beta Ta}$=Density behind the tantalum filter due to beta radiation
$D_{Ta}$=Total density behind the tantalum filter
$D_{XFe}$=Density behind the iron filter due to X-rays (<50 kev.)
$D_{\gamma Fe}$=Density behind the iron filter due to gamma rays (>50 kev.)
$D_{\beta Fe}$=Density behind the iron filter due to beta radiation
$D_{Fe}$=Total density behind the iron filter
$D_{XPl}$=Density behind the plastic filter, or area, due to X-rays (<50 kev.)
$D_{\gamma Pl}$=Density behind the plastic filter, or area, due to gamma rays (>50 kev.)
$D_{\beta Pl}$=Density behind the plastic filter, or area, due to beta radiation
$D_{Pl}$=Total density behind the plastic filter, or area
$D_{XOW}$=Density behind the open window due to X-rays (<50 kev.)
$D_{\gamma OW}$=Density behind the open window due to gamma rays (>50 kev.)
$D_{\beta OW}$=Density behind the open window due to beta radiation
$D_{OW}$=Total density behind the open window All the above densities are in standard units of optical density, as above defined.

The above set of four equations has 12 unknowns. In order to solve for these 12 unknowns, it will be necessary to specify seven conditions. Four of these conditions are:

(1), (2) The X- and beta rays produce zero density behind the tantalum filter. This was established experimentally by varying the thickness of the tantalum filter.

$$D_{XTa}=0 \quad (E)$$
$$D_{\beta Ta}=0 \quad (F)$$

(3) Beta radiation produces equivalent densities behind the iron and plastic filters. This was established experimentally by adjusting their thicknesses so as to produce equal densities $$D_{\beta Fe}=D_{\beta Pl} \quad (G)$$

(4) Equal densities are produced by gamma rays behind the iron, plastic and open window filters. This was established by the data on which FIG. 3 is based.

$$D_{\gamma Fe}=D_{\gamma Pl}=D_{OW} \quad (H)$$

Applying conditions (1) and (2) to Equation A yields $$D_{\gamma Ta}=D_{Ta} \quad (I)$$

Subtract Equations B and C and apply conditions (3) and (4)

$$(D_{XPl}-D_{XFe})=D_{Pl}-D_{Fe} \quad (J)$$

Subtract Equations C and D and apply conditions (4)

$$(D_{\beta OW}-D_{\beta Pl})=D_{OW}-D_{Pl}-(D_{XOW}-D_{XPl}) \quad (K)$$

Since there are no more conditions to apply, three of the unknowns must be combined with the other unknowns for conditions (5), (6) and (7). (These unknowns that are placed in parentheses in Equations J and K will be thought of as single unknowns.)

In order to use Equations I, J and K, the film dosimeters must be calibrated for the X-, $\gamma$ and $\beta$ radiations that are present at the location of interest. As an example, assume that uranium-beta rays exist in the presence of plutonium gamma and X-rays (about 16 kev.).

The gamma ray (density-dose) calibration or characteristic curve is obtained by exposing the film dosimeters to a standard radium source and plotting $D_{\gamma Ta}$ as a function of dose (FIGURE 4). The 16 kev. X-ray characteristic curves are attained by exposing the film dosimeters to a 16 kev. fluorescent X-ray source and plotting the difference in density behind the plastic and iron filters $(D_{XPl}-D_{XFe})$ and the open window and plastic filters $(D_{XOW}-D_{XPl})$ as a function of dose (FIGURES 5 and 6). A beta ray characteristic curve is attained by exposing the film dosimeters to a uranium-beta source and then plotting the difference in density between the open window and plastic filters $(D_{\beta OW}-D_{\beta Pl})$ as a function of dose (FIGURE 7).

To interpret dose from a film dosimeter that has been exposed to uranium beta, plutonium gamma, and X-ray in the field and subsequently developed, use the following procedure:

(1) Read the density behind the tantalum filter Ta($D_{Ta}$), Fe($D_{Fe}$), plastic ($D_{Pl}$) and open window ($D_{OW}$) filters.

(2) From the density behind the tantalum filter ($D_{Ta}$), determine the dose due to gamma radiation from the curve FG of FIGURE 4 and Equation I.

(3) From the difference in density between the plastic and iron filters ($D_{Pl}-D_{Fe}$), determine the dose due to X-rays and gamma rays less than 50 kev. from the curve HJ of FIGURE 5 and Equation J.

(4) Use the curve KL of FIGURE 6 to determine the density correction for the difference between the open window and plastic filters ($D_{XOW}-D_{XPl}$) due to the contribution from dosages due the X-rays and gamma rays <50 kev. dose found on FIGURE 5.

(5) Subtract this density correction from the difference in density between the open window and plastic filters ($D_{OW}-D_{Pl}$) and determine the dose due to beta rays from the curve MN of FIGURE 7 and Equation K.

The reliability of this filter system was demonstrated by evaluating films exposed to plutonium metal in the presence of uranium-beta radiation. The film was exposed to uranium beta doses from 90 to 400 mrads and to plutonium metal for time intervals varying from 3 to 15 minutes at a distance of one inch. From step number 5 above, it can be noted that the accuracy of the beta dose evaluation is directly related to the X-ray dose estimation. For this experiment, the beta dose evaluations were on the average within ±10% of the applied dose. From studies with a K-fluorescent X-ray source, evaluations of 16 kev. X-ray dose in the presence of both uranium-beta dose was accomplished with an accuracy of ±10% for film densities less than about 1.5 optical density units. The dose from gamma radiation with energies >50 kev., as found by step number 2, were also within ±10% of the applied dose.

EXAMPLE I

A film badge of the kind above described was subjected to a dosage from gamma rays at about 1 mev. In Table I below abbreviations for the names of the filters, or elements, are listed in the left-hand column, Ta meaning the tantalum filter, Fe the iron filter, Pl the plastic filter, or area, and OW the open window.

In the middle column are listed, in corresponding horizontal rows, readings of optical density units for areas of the photographic plate of the badge behind the respective filters, or elements, the optical density units being determined by a Beckman densitometer having a Type 1321, 6 volt polychromatic, or white light source, a Type 922 phototube, and giving readings on a Type V micromicroammeter. In the right-hand column, in the corresponding horizontal rows, are listed the calculated doses, with a notation of the step or steps of the above described method which were used during the calculations.

*Table I*

| Filter | Optical Density Units | Calculated Dose |
|---|---|---|
| Ta | .10 | Step #2 indicates 100 mr. |
| Fe | .10 | Step #3 indicates 0 mr. |
| Pl | .10 | Step #4 and 5 indicates 0 mrad. |
| OW | .10 | |

EXAMPLE II

A film badge of the type above described was subjected to a dosage from gamma rays at about 80 kev. Readings and calculations were made by the same densitometer according to the same methods used in Example I, and the results are listed in the same way in Table II as follows:

*Table II*

| Filter | Optical Density Units | Calculated Dose |
|---|---|---|
| Ta | .07 | Step #2 indicates 70 mr. |
| Fe | .38 | Step #3 indicates 0 mr. |
| Pl | .38 | Step #5 indicates 0 mrad. |
| OW | .38 | |

EXAMPLE III

A film badge of the same kind was subjected to a dosage from X-rays of <50 kev. Readings and calculations were made with the same densitometer and according to the same methods used in the previous examples, and the results are listed in the same way in Table III as follows:

*Table III*

| Filter | Optical Density Units | Calculated Dose |
|---|---|---|
| Ta | 0 | Step #2 indicates 0 mr. |
| Fe | .12 | Step #3 indicates 45 mr. |
| Pl | .19 | Step #4 and 5 indicates 0 mrad. |
| OW | .31 | |

EXAMPLE IV

A film badge of the same kind was subjected to a dosage from beta rays. Readings and calculations were made with the same densitometer and according to the same methods used in the previous examples, and the results are listed in the same way in Table IV, as follows:

*Table IV*

| Filter | Optical Density Units | Calculated Dose |
|---|---|---|
| Ta | 0 | Step #2 indicates 0 mr. |
| Fe | .03 | Step #3 indicates 0 mr. |
| Pl | .03 | Step #5 indicates 200 mrad. |
| OW | .15 | |

EXAMPLE V

A film badge was subjected to a dosage from gamma rays of about 1 mev., mixed with a dosage of gamma rays at about 80 kev. Readings and calculations were made with the same densitometer and according to the same methods as were used in the previous examples, and the results are listed in the same manner in Table V, as follows:

*Table V*

| Filter | Optical Density Units | Calculated Dose |
|---|---|---|
| Ta | .17 | Step #2 indicates 170 mr. |
| Fe | .48 | Step #3 indicates 0 mr. |
| Pl | .48 | Step #5 indicates 0 mrad. |
| OW | .48 | |

EXAMPLE VI

A film badge of the same kind was subjected to a dosage from gamma rays of about 1 mev., mixed with a dosage from X-rays of <50 kev. Readings and calculations were made with the same densitometer and according to the same methods as were used in the previous examples, and the results are listed in the same way in Table VI, as follows:

*Table VI*

| Filter | Optical Density Units | Calculated Dose |
|---|---|---|
| Ta | .10 | Step #2 indicates 100 mr. |
| Fe | .22 | Step #3 indicates 45 mr. |
| Pl | .29 | Step #4 and 5 indicates 0 mrad. |
| OW | .41 | |

EXAMPLE VII

A film badge of the same kind was subjected to a dosage from gamma rays of about 1 mev. and at the same time with a dosage from beta rays. Readings and calculations were made by the same densitometer and according to the same methods as were used in the previous examples, and the results are listed in the same way in Table VII, as follows:

*Table VII*

| Filter | Optical Density Units | Calculated Dose |
|---|---|---|
| Ta | .10 | Step #2 indicates 100 mr. |
| Fe | .13 | Step #3 indicates 0 mr. |
| Pl | .13 | Step #5 indicates 200 mrad. |
| OW | .25 | |

EXAMPLE VIII

A film badge of the same kind was subjected to a dosage from gamma rays of about 80 kev. and simultaneously with a dosage from X-rays of <50 kev. Readings and calculations were made by the same densitometer and according to the same methods as were used in the previous examples, and the results are listed in the same way in Table VIII, as follows:

*Table VIII*

| Filter | Optical Density Units | Calculated Dose |
|---|---|---|
| Ta | .07 | Step #2 indicates 70 mr. |
| Fe | .50 | Step #3 indicates 45 mr. |
| Pl | .57 | Step #4 and 5 indicates 0 mrad. |
| OW | .69 | |

EXAMPLE IX

A film badge of the same kind was subjected to a dosage from gamma rays of about 80 kev. and simultaneously with a dosage from beta rays. Readings and calculations were made with the same densitometer and according to the same methods as were used in the previous examples, and the results are listed in the same way in Table IX, as follows:

*Table IX*

| Filter | Optical Density Units | Calculated Dose |
|---|---|---|
| Ta | .07 | Step #2 indicates 70 mr. |
| Fe | .41 | Step #3 indicates 0 mr. |
| Pl | .41 | Step #5 indicates 200 mrad. |
| OW | .53 | |

EXAMPLE X

A film badge of the same kind was subjected to a dosage from X-rays of <50 kev. and simultaneously to a dosage from beta rays. Readings and calculations were made by the same densitometer and according to the same methods as were used in the previous examples, and the results are listed in the same way in Table X, as follows:

*Table X*

| Filter | Optical Density Units | Calculated Dose |
|---|---|---|
| Ta | 0 | Step #2 indicates 0 mr. |
| Fe | .15 | Step #3 indicates 45 mr. |
| Pl | .22 | Step #4 and 5 indicates 200 mrad. |
| OW | .46 | |

EXAMPLE XI

A film badge of the same kind was subjected to combined dosages from gamma rays of about 1 mev., also from gamma rays at about 80 kev., and from X-rays of less than 50 kev. Readings and calculations were made with the same densitometer and according to the same methods as were used in the previous examples, and the results are listed in the same way in Table XI, as follows:

*Table XI*

| Filter | Optical Density Units | Calculated Dose |
|---|---|---|
| Ta | .17 | Step #2 indicates 170 mr. |
| Fe | .60 | Step #3 indicates 45 mr. |
| Pl | .67 | Step #4 and 5 indicates 0 mrad. |
| OW | .79 | |

EXAMPLE XII

A film badge of the same type was subjected to combined dosages from gamma rays of about 80 kev., from X-rays of <50 kev. and a dosage from beta rays. Readings and calculations were made with the same densitometer and according to the same methods as were used in previous examples, and the results are listed in the same way in Table XII, as follows:

*Table XII*

| Filter | Optical Density Units | Calculated Dose |
|---|---|---|
| Ta | .07 | Step #2 indicates 70 mr. |
| Fe | .53 | Step #3 indicates 45 mr. |
| Pl | .60 | Step #4 and 5 indicates 0 mrad. |
| OW | .84 | |

EXAMPLE XIII

A film badge of the same type was subjected to the following combined dosages: from gamma rays at about 1 mev. and 80 kev., from X-rays of <50 kev. and from beta rays. Readings and calculations were made with the same densitometer and according to the same methods as were used in the previous examples, and the results are listed in the same way in Table XIII, as follows:

*Table XIII*

| Filter | Optical Density Units | Calculated Dose |
|---|---|---|
| Ta | .17 | Step #2 indicates 170 mr. |
| Fe | .63 | Step #3 indicates 45 mr. |
| Pl | .70 | Step #4 and 5 indicates 200 mrad. |
| OW | .94 | |

From the foregoing examples it can be seen that my system provides a reliable method of determining dosages of both high and low energy gamma rays, of X-rays, and of beta rays. As a further check on its accuracy a film badge was subjected to the combined radiations of plutonium metal, gamma rays from radium, X-rays of <50 kev., and uranium-beta radiation. It was found that the evaluations of dosages for each type radiation were within ±10% of the actual dosages. This is well within the limits of accuracy required for film badges.

It will be understood that this invention is not to be limited to the details given herein, but that it may be modified within the scope of the appended claims.

What is claimed is:

1. A dosimeter filter system comprising: a tantalum filter of sufficient thickness to block X-rays, gamma rays having energies of less than about 35 kev., and beta radiation; an iron filter; a plastic filter; said iron and plastic filters being sufficiently thick to provide equal attenuation of hard beta radiation; and an open window; said iron filter, said plastic filter, and said open window all providing equal attenuation of photon energies in excess of about 50 kev.

2. The system of claim 1 where the tantalum filter is about 20 mils thick, the iron filter is about 1 mil thick, the plastic filter is of acrylonitrile-butadiene-styrene copolymer and about 70 mils thick, and the open window and the said filters are covered with cellulose acetate-butyrate plastic about 20 mils thick.

3. A film badge comprising a back, and within the back, a tantalum filter of sufficient thickness to block X-rays, gamma rays of less than about 35 kev. energies and beta radiation; an iron filter; a plastic filter and an open window; said iron filter, said plastic filter, and said open window all providing equal attenuation of gamma rays having energies >50 kev., said iron and plastic filters being sufficiently thick to provide equal attenuation of hard beta radiation; a slide slidably fitting within the back and having filters and an open window identical with the filters and the open window within the back, each identical filter being in register with the other and the open windows being in register with each other; and a photographic plate between the back and the slide.

4. The film badge of claim 3 where the tantalum filters are about 20 mils thick, the iron filters are about 1 mil thick, the plastic filters are of acrylonitrile-butadiene-styrene copolymer about 70 mils thick, and the open window in the back and all the said filters are covered with cellulose acetate-butyrate plastic about 20 mils thick, and the open window in the slide is covered with paper.

5. A method of determining dosages of X-rays, gamma rays and beta rays from a dosimeter having a photographic plate, a tantalum filter of sufficient thickness to block X-rays, gamma rays having energies of less than 35 kev., and beta radiation, an iron filter, a plastic filter and an open window, said iron and plastic filters being sufficiently thick to provide equal attenuation of hard beta radiation; and said iron filter, said plastic filter, and said open window all providing equal attenuation of photon energies in excess of 50 kev.; comprising developing the photographic plate, measuring by means of a densitometer the optical density of the areas of the photographic plate behind the respective filters and the open window;

comparing the optical density of the area of the photographic plate behind the tantalum filter with a standard, thereby determining the dosage from gamma rays having energies in excess of about 35 kev.; comparing the difference in optical density between the area on said plate behind the plastic filter and the area behind the iron filter with a standard, thereby determining the dosage due to photon energies less than about 30 kev.; comparing the difference in optical density between the area of said plate behind the open window and the area behind the plastic filter with a standard, thereby determining an unadjusted dosage due to beta radiation; and subtracting from said unadjusted dosage a correction for density due to X-rays by comparison with a standard.

References Cited by the Examiner

UNITED STATES PATENTS

| | | | |
|---|---|---|---|
| 2,659,013 | 11/53 | Davis et al. | 250—83 |
| 2,747,103 | 5/56 | Fairbank et al. | 250—83 X |
| 3,053,983 | 9/62 | Faulkner et al. | 250—83 |

RALPH G. NILSON, *Primary Examiner.*

ARCHIE R. BORCHELT, *Examiner.*